US012592012B2

(12) United States Patent
Luo et al.

(10) Patent No.: US 12,592,012 B2
(45) Date of Patent: Mar. 31, 2026

(54) METHOD, APPARATUS, ELECTRONIC DEVICE AND READABLE MEDIUM FOR COLLAGE MAKING

(71) Applicant: Beijing Zitiao Network Technology Co., Ltd., Beijing (CN)

(72) Inventors: Lishu Luo, Beijing (CN); Yuchen Lian, Beijing (CN); Jie Tan, Beijing (CN); Xinyu Dong, Beijing (CN); Sen Wang, Beijing (CN); Haoyang Leng, Beijing (CN); Huancheng Bai, Beijing (CN); Yi Fu, Beijing (CN)

( * ) Notice: Subject to any disclaimer, the term of this patent is extended or adjusted under 35 U.S.C. 154(b) by 81 days.

(21) Appl. No.: 18/291,702

(22) PCT Filed: Aug. 24, 2022

(86) PCT No.: PCT/CN2022/114393
§ 371 (c)(1),
(2) Date: Jan. 24, 2024

(87) PCT Pub. No.: WO2023/030112
PCT Pub. Date: Mar. 9, 2023

(65) Prior Publication Data
US 2024/0378777 A1      Nov. 14, 2024

(30) Foreign Application Priority Data

Sep. 3, 2021    (CN) .......................... 202111033810.3

(51) Int. Cl.
G06T 11/60          (2006.01)
(52) U.S. Cl.
CPC .......... G06T 11/60 (2013.01); *G06T 2200/24* (2013.01)
(58) Field of Classification Search
CPC ........ G06T 11/60; G06T 2200/24; G06T 3/40
See application file for complete search history.

(56) References Cited

U.S. PATENT DOCUMENTS

2016/0093020 A1*   3/2016   Basalamah .......... H04N 5/2624
                                                              345/634
2016/0156874 A1*   6/2016   Rajagopalan ......... H04L 67/125
                                                              348/207.1
(Continued)

FOREIGN PATENT DOCUMENTS

CN          106127687 A      11/2016
CN          106355551 A       1/2017
(Continued)

OTHER PUBLICATIONS

International Search Report and Written Opinion, International Patent Application No. PCT/CN2022/114393, Oct. 25, 2022, with English translation of Search Report (8 pages).

*Primary Examiner* — Jin Cheng Wang
(74) *Attorney, Agent, or Firm* — Fish & Richardson P.C.

(57)          ABSTRACT

The invention discloses methods and an electronic device for collage making. The method includes determining, at a first device, a collage template and a first set of image blocks in the collage template to receive data imported by the first device. The method further includes sending, at the first device, collage making invitation information to a second device. The collage making invitation information is associated with the collage template, at least one of the first set of image blocks, and a second set of image blocks in the collage template to receive data to imported by the second device. The method further includes obtaining, at the first device, cooperative collage data of the second device. The method further includes determining, at the first device, a collage making result. The collage making result comprises the cooperative collage data and the data imported by the first device.

18 Claims, 10 Drawing Sheets

(56) References Cited

U.S. PATENT DOCUMENTS

| | | | | |
|---|---|---|---|---|
| 2017/0124385 A1* | 5/2017 | Ganong | ................. | G06F 16/50 |
| 2018/0027268 A1* | 1/2018 | Cheng | ................ | H04L 12/4625 |
| | | | | 375/240.26 |
| 2018/0174340 A1* | 6/2018 | Shah | ...................... | G06T 11/60 |
| 2018/0220075 A1* | 8/2018 | Castro Calderón | ..... | G06T 11/60 |
| 2019/0019319 A1* | 1/2019 | Malle | ..................... | G06T 11/60 |
| 2019/0294646 A1* | 9/2019 | Levy | ................. | G06F 16/9536 |
| 2020/0143514 A1* | 5/2020 | Yadav | .................... | G06T 11/60 |
| 2020/0150832 A1* | 5/2020 | Winn | ............... | A61K 39/39566 |
| 2020/0311997 A1* | 10/2020 | Takeyama | .......... | H04N 1/00196 |
| 2021/0342972 A1* | 11/2021 | Mironica | ............. | G06T 3/4038 |
| 2022/0078829 A1* | 3/2022 | Bergheim | ............. | G16H 30/20 |
| 2022/0091706 A1* | 3/2022 | Winn | ..................... | G06F 16/54 |
| 2023/0196645 A1* | 6/2023 | Temple | ............... | G06Q 10/101 |
| | | | | 715/205 |

FOREIGN PATENT DOCUMENTS

| | | |
|---|---|---|
| CN | 107786803 A | 3/2018 |
| CN | 111340705 A | 6/2020 |
| CN | 112449110 A | 3/2021 |

* cited by examiner

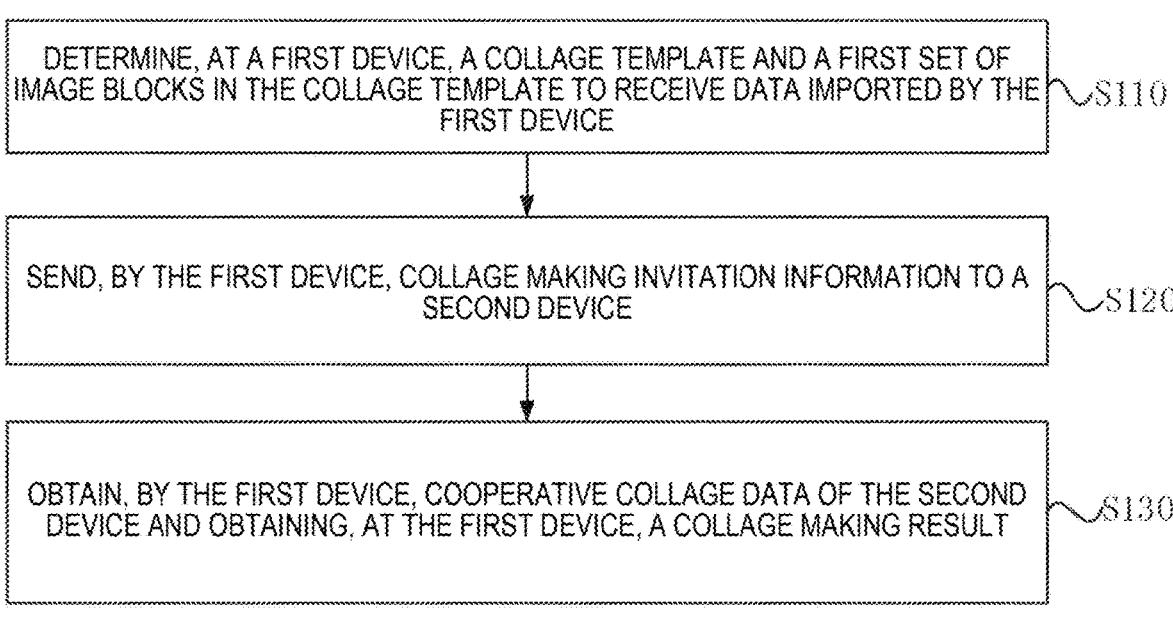

DETERMINE, AT A FIRST DEVICE, A COLLAGE TEMPLATE AND A FIRST SET OF IMAGE BLOCKS IN THE COLLAGE TEMPLATE TO RECEIVE DATA IMPORTED BY THE FIRST DEVICE — S110

SEND, BY THE FIRST DEVICE, COLLAGE MAKING INVITATION INFORMATION TO A SECOND DEVICE — S120

OBTAIN, BY THE FIRST DEVICE, COOPERATIVE COLLAGE DATA OF THE SECOND DEVICE AND OBTAINING, AT THE FIRST DEVICE, A COLLAGE MAKING RESULT — S130

FIG. 1

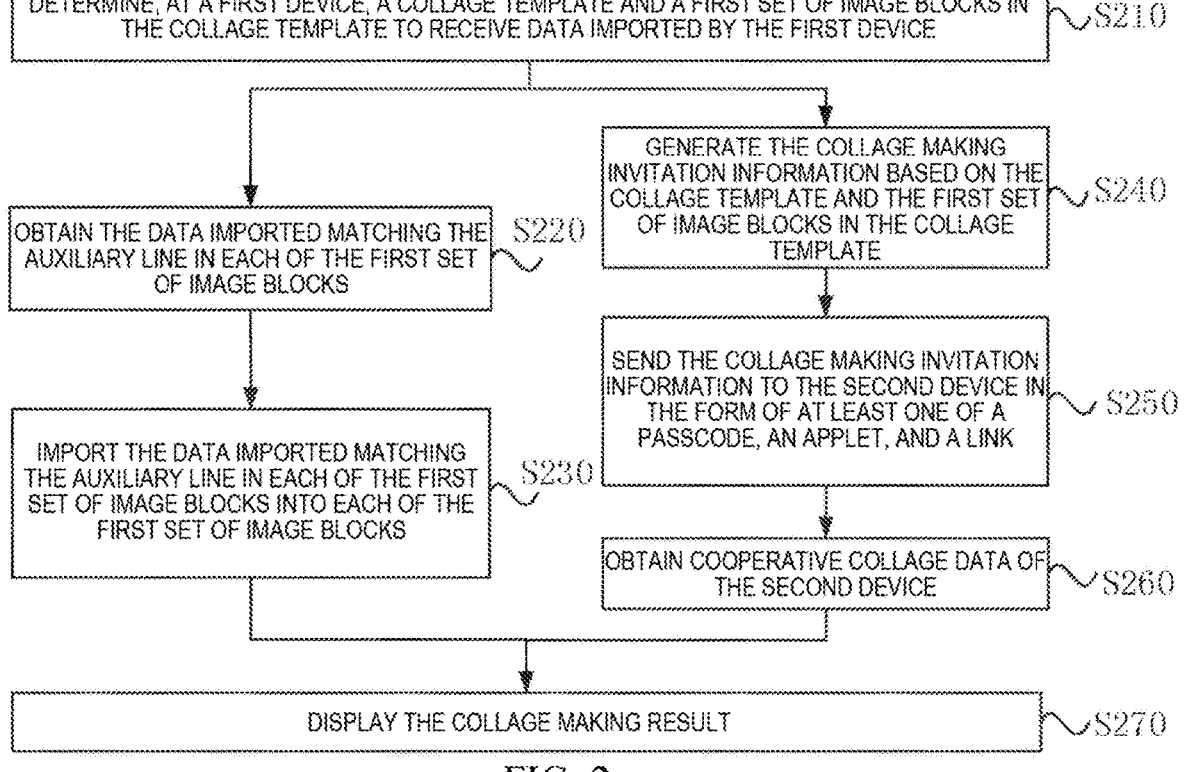

DETERMINE, AT A FIRST DEVICE, A COLLAGE TEMPLATE AND A FIRST SET OF IMAGE BLOCKS IN THE COLLAGE TEMPLATE TO RECEIVE DATA IMPORTED BY THE FIRST DEVICE — S210

OBTAIN THE DATA IMPORTED MATCHING THE AUXILIARY LINE IN EACH OF THE FIRST SET OF IMAGE BLOCKS — S220

GENERATE THE COLLAGE MAKING INVITATION INFORMATION BASED ON THE COLLAGE TEMPLATE AND THE FIRST SET OF IMAGE BLOCKS IN THE COLLAGE TEMPLATE — S240

IMPORT THE DATA IMPORTED MATCHING THE AUXILIARY LINE IN EACH OF THE FIRST SET OF IMAGE BLOCKS INTO EACH OF THE FIRST SET OF IMAGE BLOCKS — S230

SEND THE COLLAGE MAKING INVITATION INFORMATION TO THE SECOND DEVICE IN THE FORM OF AT LEAST ONE OF A PASSCODE, AN APPLET, AND A LINK — S250

OBTAIN COOPERATIVE COLLAGE DATA OF THE SECOND DEVICE — S260

DISPLAY THE COLLAGE MAKING RESULT — S270

SELECT A POSITION TO BE
FILLED, AND ENTER
CAPTURING INTERFACE 328
330
332

GENERATE
COLLAGE

SEND
INVITATION

334

336

338

DEPTH

1×

SIZE

2×

4×

FEATURE MAP 340  CONVOLUTIONAL UNIT  DOWN-SAMPLING  UP-SAMPLING

342

SHARE TO PLATFORM 1 ⟍ 344

SAVE LOCALLY ⟍ 346

SHARE TO PLATFORM 2

| RECEIVE, AT A SECOND DEVICE, COLLAGE MAKING INVITATION INFORMATION FROM A FIRST DEVICE | ⟍S310 |
| CALL, BY THE SECOND DEVICE, THE COLLAGE TEMPLATE BASED ON THE COLLAGE MAKING INVITATION INFORMATION | ⟍S320 |
| GENERATE, BY THE SECOND DEVICE, COOPERATIVE COLLAGE DATA BASED ON THE COLLAGE TEMPLATE | ⟍S330 |

ENTER A PASSWORD,
AND DUET WITH ME˜

JOIN THE DUET

| FORWARDS COLLAGE MAKING INVITATION INFORMATION FROM A FIRST DEVICE TO A SECOND DEVICE | S410 |
| --- | --- |
| FORWARD COOPERATIVE COLLAGE DATA FROM THE SECOND DEVICE TO THE FIRST DEVICE AND FORWARD A COLLAGE MAKING RESULT | S420 |

510

520

530

610

620

630

710

720

METHOD, APPARATUS, ELECTRONIC DEVICE AND READABLE MEDIUM FOR COLLAGE MAKING

CROSS-REFERENCE

This application is a national stage of International Application No. PCT/CN2022/114393, filed on Aug. 24, 2022, which claims priority to Chinese Patent Application No. 202111033810.3, filed on Sep. 3, 2021, All of the aforementioned patent applications are hereby incorporated by reference in their entireties.

FIELD

The present disclosure relates to the field of image processing technology, for example, to a method, apparatus, electronic device, and readable media for collage making.

BACKGROUND

With the continuous development of social software and capturing software, the functions of smart terminals are becoming more and more abundant. Various entertaining and interesting applications have emerged, such as splicing, arranging, and beautifying multiple photos to make them more storytelling and expressive. For collage making, users can capture multiple photos with their limbs or other props, and then splice these photos together to form a complete pattern. For example, users can capture multiple photos with their arms in different poses, and then arrange all the photos together. After connecting the arms in a plurality of photos, they can form a specified shape (such as circle, heart-shaped, etc.).

During a process of collage making, the users usually first select a template, and then select multiple photos from the terminal to fill in appropriate positions in the template, which can automatically generate a collage. However, this method of collage making can only be implemented in one terminal, and all photos need to be completed independently by one user. It does not support the joint participation or interaction of a plurality of users (especially remote users). If multiple users want to put their photos together in one picture, they can only send their photos to one user first, and then the user can complete the operation of collage making. In addition, the size, style, capturing angle, etc. of photos of different users may vary greatly, making it difficult to ensure the effect of the collage. Therefore, some users' photos may need to be retaken. It can be seen that applications of collage making has a single implementation form, poor interactivity, and low efficiency.

SUMMARY

The present disclosure provides a method, an apparatus, an electronic device, and a readable medium for collage making. This may improve the interactivity and flexibility of applications of collage making while also improving the efficiency of collage making.

The present disclosure provides a method of collage making. The method comprises determining, at a first device, a collage template and a first set of image blocks in the collage template of which data is to be imported by the first device. The collage template comprises a plurality of image blocks. The first set of image blocks is a subset of the plurality of image blocks. The method further comprises sending, at the first device, collage making invitation information to a second device. The collage making invitation information is associated with the collage template. The collage making invitation information is further associated with at least one of the first set of image blocks and a second set of image blocks in the collage template of which data to be imported by the second device. The method further comprises obtaining, at the first device, cooperative collage data of the second device. The cooperative collage data of the second device comprises data imported by the second device for at least one second set of image blocks in the collage template. The method further comprises obtaining, at the first device, a collage making result. The collage making result comprises the cooperative collage data and data imported of the first device.

The present disclosure further provides a method of collage making. The method comprises receiving at a second device, collage making invitation information from a first device. The collage making invitation information is associated with a collage template. The collage making invitation information is further associated with at least one of the following in the collage template: a first set of image blocks of which data is to be imported by the first device and a second set of image blocks of which data is to be imported by the second device. The collage template comprises a plurality of image blocks. The first set of image blocks is a subset of the plurality of image blocks. The method further comprises calling, at the second device, the collage template based on the collage making invitation information. The method further comprises generating, at the second device, cooperative collage data based on the collage template. The cooperative collage data comprises data imported for at least one second set of image blocks in the collage template. The method further comprises obtaining, at the second device, a collage making result. The collage making result comprises the cooperative collage data and data imported of the first device.

The present disclosure further provides a method of collage making. The method comprises forwarding, at a server, collage making invitation information from a first device to a second device. The collage making invitation information is associated with a collage template. The collage making invitation information is further associated with at least one of the following in the collage template: a first set of image blocks of which data is to be imported by the first device and a second set of image blocks of which data is to be imported by the second device. The collage template comprises a plurality of image blocks. The first set of image blocks is a subset of the plurality of image blocks. The method further comprises forwarding, at the server, cooperative collage data from the second device to the first device. The cooperative collage data comprises data imported for at least one second set of image blocks in the collage template. The method further comprises forwarding, at the server, a collage making result. The collage making result comprises the cooperative collage data and data imported of the first device.

The present disclosure further provides an apparatus for collage making. The apparatus comprises a template determination module configured to determine a collage template and a first set of image blocks in the collage template of which data is to be imported by the first device. The collage template comprises a plurality of image blocks. The first set of image blocks is a subset of the plurality of image blocks. The apparatus further comprises an information sending module configured to send collage making invitation information to a second device. The collage making invitation information is associated with the collage template. The collage making invitation information is further associated with at least one of the first set of image blocks and a second set of image blocks in the collage template of which data to be imported by the second device. The apparatus further comprises a data obtaining module configured to obtain cooperative collage data of the second device. The cooperative collage data of the second device comprises data imported by the second device for at least one second set of image blocks in the collage template. The apparatus further comprises a result obtaining module configured to obtain a collage making result. The collage making result comprises the cooperative collage data and data imported of the first device.

The present disclosure further provides an apparatus for collage making. The apparatus comprises an information receiving module configured to receive collage making invitation information from a first device. The collage making invitation information is associated with a collage template. The collage making invitation information is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks. The apparatus further comprises a template calling module configured to call the collage template based on the collage making invitation information. The apparatus further comprises a data generation module configured to generate cooperative collage data based on the collage template. The cooperative collage data comprises data imported for at least one second set of image blocks in the collage template. The apparatus further comprises a result obtaining module configured to obtain a collage making result. The collage making result comprises the cooperative collage data and data imported of the first device.

The present disclosure further provides an apparatus for collage making. The apparatus comprises a first forwarding module configured to forward collage making invitation information from a first device to a second device. The collage making invitation information is associated with a collage template. The collage making invitation information is further associated with at least one of the following in the collage template: a first set of image blocks of which data is to be imported by the first device and a second set of image blocks of which data is to be imported by the second device. The collage template comprises a plurality of image blocks. The first set of image blocks is a subset of the plurality of image blocks. The apparatus further comprises a second forwarding module configured to forward cooperative collage data from the second device to the first device. The cooperative collage data comprises data imported for at least one second set of image blocks in the collage template. The apparatus further comprises a third forwarding module configured to forward a collage making result. The collage making result comprises the cooperative collage data and data imported of the first device.

The present disclosure further provides an electronic device. The electronic device comprises one or more processors and a storage device configured to store one or more programs. The one or more programs, when the one or more programs executed by the one or more processors, causes the one or more processors to implement the method of collage making as described above.

The present disclosure further provides a computer readable medium having stored thereon a computer program. The program, when executed by a processor, implements the method of collage making as described above.

BRIEF DESCRIPTION OF THE DRAWINGS

FIG. 1 is a flowchart of a method of collage making provided by an embodiment of the present disclosure;

FIG. 2 is a flowchart of a method of collage making provided by an embodiment of the present disclosure;

DETAILED DESCRIPTION

Figure 3A:
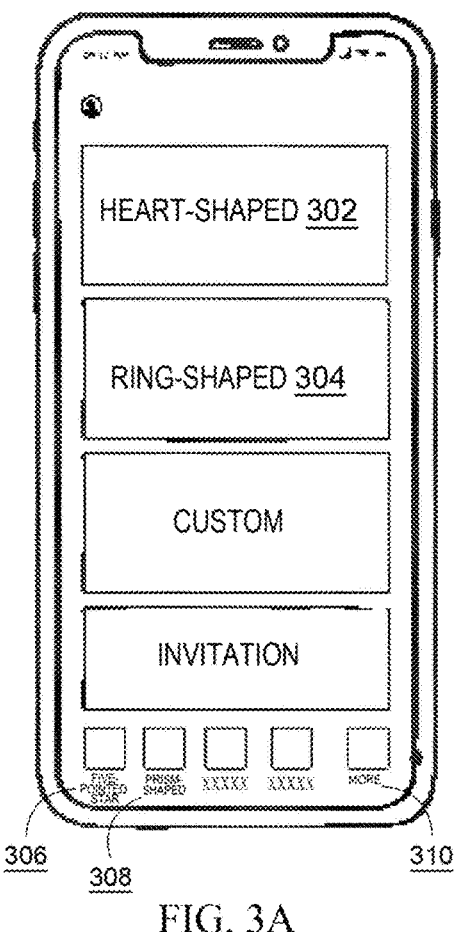
FIG. 3A is a schematic diagram of selecting collage template provided by the embodiment of the present disclosure.

The following will describe the embodiments of the present disclosure with reference to accompanying drawings. Although some embodiments of the present disclosure are shown in the accompanying drawings, the present disclosure can be implemented in various forms, and these embodiments are provided to understand the present disclosure. The accompanying drawings and embodiments of the present disclosure are for illustrative purposes only.

Steps described in the method embodiments of the present disclosure may be performed in a different order and/or in parallel. Furthermore, the method embodiments may include additional steps and/or omit performing the illustrated steps. The scope of the present disclosure is not limited in this regard.

As used herein, the term "include" and its variants should be construed as open terms meaning "including, but not limited to". The term "based on" means "at least partially based on". The term "one embodiment" means "at least one embodiment". The term "another embodiment" means "at least one another embodiment". The terms "some embodiments" means "at least some embodiments". Related definitions of other terms will be given in the following descriptions.

The concepts of "first", "second" and the like mentioned in the present disclosure are used only to distinguish different apparatuses, modules or units but not to limit the order or interdependence of the functions performed by these apparatuses, modules or units.

The modifications of "a" and "a plurality" mentioned in the present disclosure are schematic rather than limiting, and it should be understood by those skilled in the art that unless otherwise explicitly stated in the context, they should be understood as "one or more".

Names of messages or information interacted among multiple apparatuses in the embodiments of the present disclosure are used for illustrative purposes only but are not intended to limit the scope of these messages or information.

In the following embodiments, both optional features and examples are provided in each embodiment, the individual features described in the embodiments may be combined to form a plurality of optional solutions, and each numbered embodiment should not be considered as only one technical solution. In addition, without conflict, the embodiments and features in the present disclosure can be combined with each other.

Embodiment 1

FIG. 1 is a flowchart of a method of collage making provided by the embodiment 1 of the present disclosure. The method may be applied to the case where different electronic devices cooperate to complete collage making. A first device may invite a second device to complete a task of collage making for different image blocks. The method may be performed by an apparatus for collage making, which may be implemented by software and/or hardware and integrated on an electronic device. The electronic device in this embodiment may be a device with image processing functions such as a computer, laptop, tablet, or smartphone.

In this disclosure, "device" refers to the first device or the second device, "collage data" refers to data imported or cooperative collage data, and "image block" refers to a first set of image blocks or a second set of image blocks.

As shown in FIG. 1, the embodiment 1 of the present disclosure provide a method of collage making, which may be applied to the first device, which may be a device that initiates a collage making invitation. The method of collage making is further described below.

At S110, the first device determines a collage template and a first target image block in the collage template of which data is to be imported by the first device. The collage template comprises a plurality of image blocks. The first set of image blocks is a subset of the plurality of image blocks.

The collage template is a template that guide users of different devices to import collage data in accordance with image blocks, with the purpose of arranging multiple images in a specified way or combining multiple images together to present specified content. Herein, an image block to be imported by the first device into collage data is the first set of image blocks, and an image block to be imported by the second device into data is the second set of image blocks. The collage template includes a plurality of image blocks. The plurality of image blocks may be arranged in accordance with a particular shape, for example, arranged in a square, triangular, nine-square grid or irregular shape, etc. Each image block may have an auxiliary line for guiding the user to pose in accordance with the posture represented by the auxiliary. The posture of the plurality of image blocks are associated. For example, the characters in the plurality of image blocks use gestures to gesture sequentially increasing numbers, or show joy, anger, sadness, happiness and other expressions in the plurality of image blocks, or the character's body movements in the plurality of image blocks may be connected into a specific shape (e.g., square, triangular, irregular shape, etc.).

In this embodiment, the first set of image blocks and the second set of image blocks in the collage template may be randomly assigned or set by default. That is, when the collage template is determined, the first set of image blocks and the second set of image blocks may be determined accordingly. Alternatively, the first device may select a part of the image block from the collage template as the first set of image blocks and import data imported into the first set of image blocks. The data imported may be photos captured by the first device or suitable pictures selected from a local gallery of the first device. For other image blocks in the collage template (mainly referring to the second set of image blocks), the first device may invite the second device to import cooperative collage data, which may be photos captured by the second device or suitable pictures selected from a local gallery of the second device. Different devices are responsible for different image blocks and work together to complete collage making.

For example, the collage template is a nine-square grid with nine image blocks arranged. For the first device, the first set of image blocks includes the first image block and the ninth image block. The first device may target the first image block and the ninth image block to import data imported, while the other seven image blocks are the second set of image blocks that may import cooperative collage data by one or more second devices.

The collage template may further include an image block which does not require any device to import data. Such image blocks may be blank, or image blocks having a particular pattern, etc., for forming collage making result with data imported from a plurality of devices together.

The collage template may be selected by the user from a template library or drawn by the user to independently determine the number of image blocks, a layout of image blocks, and whether there are auxiliary lines used to guide the user to pose in the collage template, thereby achieving flexible and diverse collage.

At S120, the first device sends collage making invitation information to a second device. The collage making invitation information is associated with the collage template. The collage making invitation information is further associated with at least one of the first set of image blocks and a second set of image blocks in the collage template of which data to be imported by the second device.

The first device may send collage making invitation information to the second device in the form of passcodes, mini programs, and/or web links, inviting the second device to cooperate with the first device to complete collage making. The collage making invitation information is used to indicate the collage template, and further to indicate the first set of image blocks and/or the second set of image blocks, so that the second device may clarify which image blocks are responsible for importing the corresponding data imported by the first device, and/or which image blocks support importing the corresponding cooperative collage data by the second device. For example, the collage making invitation information includes an Application Programming Interface (API) for launching the application of collage making and calling the collage template. The user of the second device may copy the passcode and open the application of collage making or call the collage template of the first device through mini programs or web links. In the collage template, the first set of image blocks and the second set of image blocks may be distinguished. In this case, the user of the second device may select one or more image blocks of the second set of image blocks and import corresponding cooperative collage data thereto.

When sending the collage making invitation information, the first device may further be in a state where the first set of image blocks is not selected. In this case, all image blocks in the collage template support editing by the second device. Before selecting the first set of image blocks, the first device may send the collage making invitation information to the second device to invite the second device to call the collage template. The second device first selects the image block it is responsible for importing (which is the second set of image blocks for the first device), and then the first device selects one or more image blocks from the image blocks not selected by the second device as the first set of image blocks for importing data imported.

The collage making invitation information may be sent by the first device and forwarded by a server to the second device.

At S30, the first device obtains cooperative collage data of the second device. The cooperative collage data of the second device comprises data imported by the second device for at least one second set of image blocks in the collage template. The first device obtains a collage making result. The collage making result comprises the cooperative collage data and data imported of the first device.

The cooperative collage data may be photos captured by the second device or suitable pictures selected from the local gallery of the second device. After the user of the second device imports cooperative collage data into at least one second set of image blocks, the first device may synchronize and display the cooperative collage data. In addition, the first device, the second device, or the server may obtain a collage making result based on the data imported and the cooperative collage data.

In one embodiment, the second device may have a plurality of different second devices for importing the cooperative collage data to different second set of image blocks.

In a task of collage making, both the first and second devices call the same collage template. If either party selects an image block or imports collage data into any image block, the other devices may synchronize the import operation in real time to keep consistent progress and effect of collage making among different devices. For example, after the first device imports data imported into the first and ninth image blocks in a nine-square grid, the corresponding images have been imported into the first and ninth image blocks displayed by the second device, and the other image blocks are temporarily blank. If the second device imports cooperative collage data into the second image block, the first device may further display that the corresponding image has been imported into the second image block. The collage data is synchronized in real time among devices using the same collage template. Each device may not only import collage data locally, but also obtain collage data imported from other devices remotely. On this basis, different devices may be used to splice collage data and generate a spliced result.

The above collage making invitation information and collage data may be forwarded among different devices through the server.

According to the method of collage making of the present embodiment, the first device may import data imported for the first set of image blocks, and may invite the second device to import cooperative collage data for the second set of image blocks, thereby cooperating with the second device to complete collage making, improving the interactivity and flexibility of the application of collage making. In the process of collage making, the collage data from different devices may be imported into the image blocks of the collage template from the corresponding device, without first summarizing to the same device, and may also improve the efficiency of collage making.

Embodiment 2

FIG. 2 is a flowchart of a method of collage making provided in the embodiment 2 of the present disclosure. Based on the embodiment 1, the embodiment 2 describes the process of determining the collage template, the first device importing data imported, and the second device importing cooperative collage data. Technical details not described in this embodiment may be referred to any of the above embodiments.

In the present embodiment, corresponding auxiliary lines are displayed in the area of each image block in the collage template. The auxiliary line in each of the first set of image blocks is used to indicate the first device to import data imported that matches the auxiliary line in the first set of image blocks; the auxiliary line in each of the second set of image blocks is used to indicate the second device to import cooperative collage data that matches the auxiliary line in the second set of image blocks.

The auxiliary line may be used to guide the user to pose for capturing, or may be used as a reference baseline to search for matching collage data in a gallery. In this embodiment, there is an association between the postures of a plurality of image blocks. The following is an example of how the limb movements of a character in a photo of a plurality of image blocks may be connected to form a particular shape (heart-shaped).

As shown in FIG. 2, the embodiment 2 of the present disclosure provides a method of collage making. The method is further described below.

At S210, the first device determines a collage template and a first set of image blocks in the collage template of which data is to be imported by the first device.

Determining the collage template comprises determining the collage template based on selection information input by a user through a template selection page. A content displayed in the template selection page comprises identifications of a plurality of candidate collage templates. Alternatively or in addition, the determining the collage template comprises generating the collage template based on drawing data input by the user through a self-drawing page. The self-drawing page comprises a drawing board control and at least one of: an image block number selection control, an image block layout control, an auxiliary line drawing control, an clearing and redrawing control, an undo control, or a template confirmation control. The drawing data comprises image block layout data, and an auxiliary line for guiding the user to complete an action or marking a shape.

For the collage template, one case is that the user inputs selection information of the collage template through a template selection page. FIG. 3A is a schematic diagram of selecting a collage template provided in the embodiment 2 of the present disclosure. As shown in FIG. 3A, the template selection page displays names of candidate collage templates, such as heart-shaped 302, ring-shaped 304, five-pointed star 306, and prism-shaped 308, etc. More candidate collage templates may be expanded in the menu of "More Templates" 310. In some embodiments, a number and/or thumbnail of candidate collage templates may further be displayed. In addition, templates commonly used by users, newly released templates, or templates with high popularity may be displayed with larger thumbnails or at the top position; while templates that are not commonly used, have been released for a long time, or have low popularity may be displayed with smaller thumbnails below or folded in the menu of "More Templates" 310.

In one embodiment, the template selection page may further include a custom entry for collage templates, or an interface for inviting the second device to participate in the task of collage making and the like.

Figure 3B:
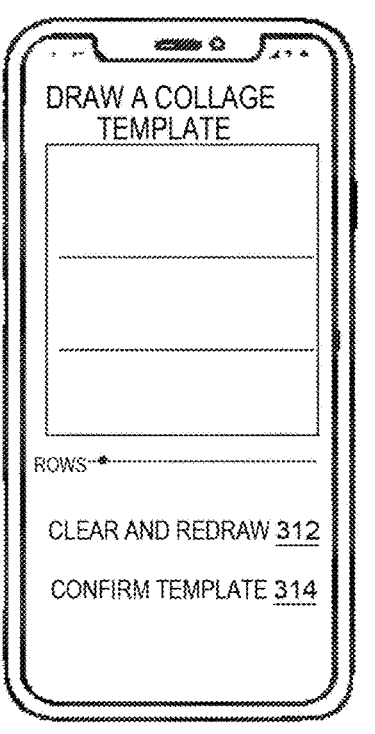
FIG. 3B is a schematic diagram of drawing collage template provided by the embodiment of the present disclosure.

Another case is that the user inputs drawing data through a self-drawing page to customize the collage template. For example, generating a 4*5 image block array and drawing the shape the user wants to splice in the image block array, the first device may generate a template to guide the user to capture in accordance with the user's drawing data. FIG. 3B is a schematic diagram of drawing a collage template provided in the embodiment 2 of the present disclosure. As shown in FIG. 3B, the self-drawing page displays a drawing board control, and the user may layout image blocks in the drawing board area and add auxiliary lines to each image block. In addition, the self-drawing page may display one or more of the following controls: an image block number selection control, for example, the user may input in the input box, select in the options, or adjust the number of rows, columns, and total number of image blocks by pressing buttons; an image block layout control, for example, the user may adjust the image blocks to move up, down, left, right, etc. by pressing buttons, or drag the image block to a specified position; an auxiliary line drawing control, for example, the user may draw some lines inside the image block or between different image blocks by dragging the mouse, as auxiliary lines for guiding users to pose for capturing; an clearing and redrawing control 312, the user may clear all image blocks and auxiliary lines in the drawing board through the clearing and redrawing control, so that the drawing board may return to the blank state or default state; an undo control, the user may undo the latest drawing operation through the undo control, and restore to the state before the latest operation; a template confirmation control 314, the user may confirm the completion of drawing through the template confirmation control to make the drawn collage template effective.

In this embodiment, the drawing data includes image block layout data (including the number, rows, columns, arrangement order, positional relationship, etc. of image blocks), and may further include auxiliary lines for guiding users to complete corresponding actions or for marking a shape. The user may pose for capturing according to the shape represented by the auxiliary line, or search for pictures with a matching shape label from the gallery and import it into the image block. For example, if the shape represented by the auxiliary line is a right hand of the character raised, the first device may recognize whether there is a picture with a shape label of the character raising the right hand in its gallery. If there is a picture with a shape label of the character raising the right hand in the gallery, the picture may be imported as collage data into the first set of image blocks where the auxiliary line is located.

Figure 3C:
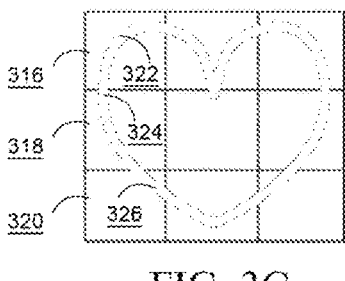
FIG. 3C is a schematic diagram of a collage interface provided by the embodiment of the present disclosure.

FIG. 3C is a schematic diagram of a collage interface provided in the embodiment 2 of the present disclosure. As shown in FIG. 3C, the collage template includes nine image blocks (such as an image block 316, an image block 318, an image block 320) arranged in three rows and three columns. Each image block has a corresponding auxiliary line (such as an auxiliary line 322, an auxiliary line 324, an auxiliary line 326), and multiple auxiliary lines are connected to form a heart-shaped puzzle.

In one embodiment, the drawn collage template may be saved to the local device, or may be uploaded or released to the server platform of the application of collage making, so that other users may directly download and use the collage template.

In some embodiments, the collage template may be shared by other users or other devices, or when accessing the works of collage making posted by other users, obtained by selecting "capture the same style" to copy the collage template used by other users, or by searching or filtering in the template library.

At S220, the first device obtains the data imported matching the auxiliary line in each of the first set of image blocks.

The data imported may be photos taken by the user of the first device according to the guidance of the auxiliary line, or pictures obtained by searching from the first device's gallery. The shape label of the picture is consistent with the shape represented by the auxiliary line.

At S230, the first device imports the data imported matching the auxiliary line in each of the first set of image blocks into each of the first set of image blocks.

At S240, the first device generates the collage making invitation information based on the collage template and the first set of image blocks in the collage template.

At S250, the first device sends the collage making invitation information to the second device in the form of at least one of a passcode, an applet, and a link.

The collage making invitation information may be sent in the form of a passcode. After copying the passcode, the user of the second device may open the collage template in the application of collage making.

It may further be sent through the mini program to invite the second device to join collage making character and achieve multi-person collaborative collage making.

At S260, the first device obtains cooperative collage data of the second device.

The cooperative collage data may be a photo taken by the user of the second device based on the auxiliary line in the second set of image blocks, or a picture found in the second device's gallery with a shape label that matches the shape represented by the auxiliary line. The cooperative collage data of the second device may be directly forwarded by the server to the first device or included in the collage making result and forwarded by the server to the first device.

At S270, the first device displays the collage making result. The collage making result is obtained by splicing, based on the collage template, at the first device and the second device, the data imported corresponding to each of the first set of image blocks and the cooperative collage data corresponding to each of the second set of image blocks.

Splicing may combine collage data from different image blocks into a whole, and the collage making result is a combined picture. During the splicing process, white space, or gaps between different image blocks may be removed, and the edges where different image blocks meet may be smoothed, blurred, aligned, etc. In addition, if the collage template further includes image blocks that do not require any equipment to import data, such as blank or image blocks with particular patterns, these image blocks need to be interspersed in the data imported and cooperative collage data to form a collage making result.

The imported collage data may be displayed synchronously between the first device and the second device. Based on this, either the first device, the second device, or the server may trigger a splicing operation to generate the final collage making result after the collage data import is completed.

In one embodiment, the collage template includes at least one type of image block of: a first type of image block with a first mark displayed in a region of the first type of image block, the first mark representing that the first type of image block is in a state without the data imported imported; a second type of image block with a second mark displayed in a region of the second type of image block, the second mark representing that the second type of image block is in a state with the data imported imported, and that editing of the imported data imported is support; or a third type of image block with a third mark displayed in a region of the third type of image block, the third mark representing that the third type of image block is associated with the cooperative collage data of the second device.

Figure 3D:
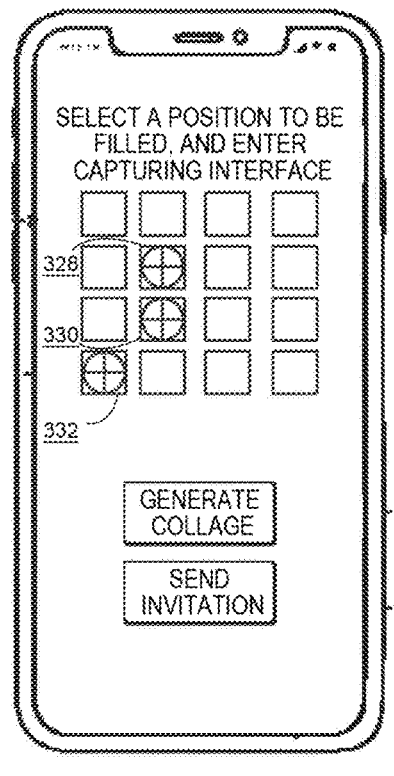
FIG. 3D is a schematic diagram of a collage template provided by the embodiment of the present disclosure.

FIG. 3D is a schematic diagram of a collage template provided in the embodiment 2 of the present disclosure. As shown in FIG. 3D, in the interface of collage making, the collage template includes 4×4 image blocks, among which the second image block 328 in the second row, the second image block 330 in the third row, and the first image block 332 in the fourth row are all first type of image blocks. The first type of image block has a first mark, representing that the first type of image block is in a state without the data imported imported. The users may click on the first type of image block to import the corresponding data imported. For the second type of image block in the state with the data imported imported, the second mark identification may be used. The user may click on the second type of image block to delete the imported data imported. After deletion, the image block may be replaced with the first mark identification. The user may further click on the second type of image block to replace the imported data imported with other photos or pictures, and still use the second mark identification after replacement. For the third type of image block selected by the second device, the third mark identification may be used. After the second device imports cooperative collage data into the third type of image block, the first device may see the cooperative collage data (or its thumbnail) corresponding to the third type of image block from the collage template. The first device cannot edit or change the third type of image block.

In one embodiment, obtaining the data imported matching the auxiliary line in each of the first set of image blocks comprises: displaying each of the first set of image blocks sequentially in a capturing interface to guide the user to complete and capture an action corresponding to each of the first set of image blocks based on the auxiliary line in each of the first set of image blocks, and using a capturing result as the data imported corresponding to each of the first set of image blocks; or searching, based on the auxiliary line in each of the first set of image blocks, for a material with a shape label matching the auxiliary line in each of the first set of image blocks from a specified material library, and using the searched material as the data imported corresponding to each of the first set of image blocks.

Figure 3E:
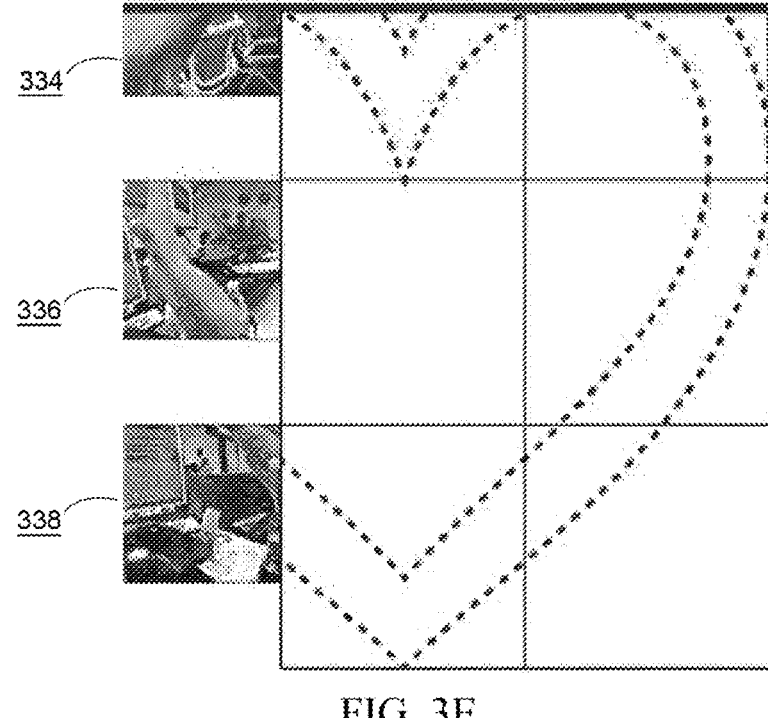
FIG. 3E is a schematic diagram of capturing according to an auxiliary line provided by the embodiment of the present disclosure.

One case is that the user of the first device completes and captures the corresponding action according to the auxiliary line in the first set of image blocks to obtain the data imported corresponding to the first set of image blocks. For example, the first set of image blocks is the three image blocks (i.e., the image block 316, the image block 318, the image block 320) in the first column from the left in FIG. 3C, that is, the posture that the user needs to pose for includes the leftmost part of the heart-shaped part. FIG. 3E is a schematic diagram of capturing according to the auxiliary line provided by the embodiment 2 of the present disclosure. As shown in FIG. 3E, the user may use the palm, wrist, or arm to sequentially pose a section of the arc belonging to the leftmost part of the heart-shaped part of the three image blocks of the first set of image blocks and capture, and finally obtain the data imported (such as collage data 334, collage data 336, collage data 338) of the leftmost part of the heart-shaped part. During the capture process, the user may click on the first set of image blocks in the collage template in any order to jump to the capturing interface for the first set of image blocks. After the capture is completed, the first set of image blocks in the collage template has been filled with corresponding data imported (which may display the thumbnail of the photo), and then the user clicks on the next image block of the first set of image blocks for capturing until all first set of image blocks are captured. Similarly, for the second set of image blocks, the user of the second device may complete and capture the corresponding action according to the auxiliary line in the second set of image blocks.

Another case is to search for suitable pictures to import from the gallery of the first device according to the auxiliary line of each of the first set of image blocks. For example, the first set of image blocks is the three image blocks (i.e., the image block 316, the image block 318, the image block 320) in the first column from the left in FIG. 3C, and the corresponding shape is the three arcs of the leftmost part of the heart-shaped shape (i.e., the auxiliary line 322, the auxiliary line 324, the auxiliary line 326). Through the human posture recognition model (such as a neural network model with human posture recognition function), it is possible to recognize which human postures in the pictures in the first device gallery are consistent with the shapes of these three arcs, and then import these three image blocks of the first set of image blocks as data imported. Similarly, for the second set of image blocks, the second device may search for the corresponding image from the gallery and import it as cooperative collage data according to the auxiliary line in the second set of image blocks.

In one embodiment, before importing the data imported matching the auxiliary line in each of the first set of image blocks into each of the first set of image blocks, the method further comprising: for each of the first set of image blocks, extracting key points in the data imported matching the auxiliary line in each of the first set of image blocks; and correcting the data imported to cause the key points in the data imported to match the auxiliary line in each of the first set of image blocks.

For the data imported that needs to be imported into the first set of image blocks, deep learning methods may be used to extract human key points from photos or pictures, align them with the auxiliary line in the first set of image blocks, and refer to the auxiliary line in the first set of image blocks to rotate, scale, stretch, etc. the data imported to correct the position and angle of the data imported, so that the key points in the data imported coincide with the auxiliary line as much as possible, thereby matching the collage template more accurately, making the collage data in different image blocks more accurately connected and improving the quality of collage making results.

After extracting the key points in the data imported, some key points that match the auxiliary line in the first set of image blocks may further be selected, thereby cropping the data imported. On this basis, correct the part that may match the auxiliary line in the first set of image blocks.

Figure 3F:
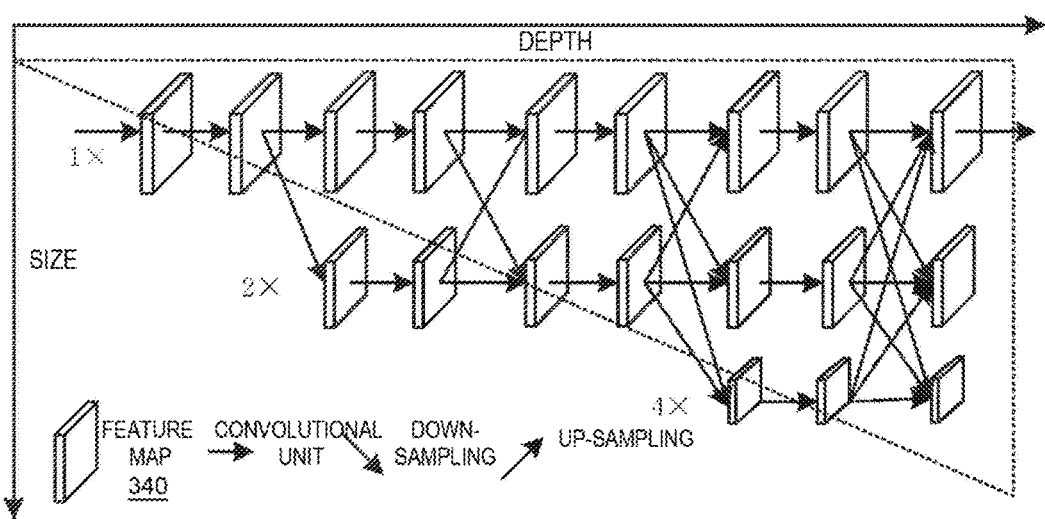
FIG. 3F is a schematic diagram of a neural network model for extracting key points provided by the embodiment of the present disclosure.

Exemplary, human key points are extracted from an image through a neural network model. FIG. 3F is a schematic diagram of a neural network model provided in the embodiment 2 of the present disclosure for extracting key points. The neural network model may be a High Resolution Net (HRNet). The basic principle of HRNet is to connect feature map 340 branches with different resolutions in parallel, and on the basis of parallel connection, add information interaction (Fusion) between different branches to achieve the purpose of strong semantic information and accurate position information. Based on this, human key points, such as nose, wrist, shoulder, etc. that may be used to describe shape, are extracted.

Figure 3G:
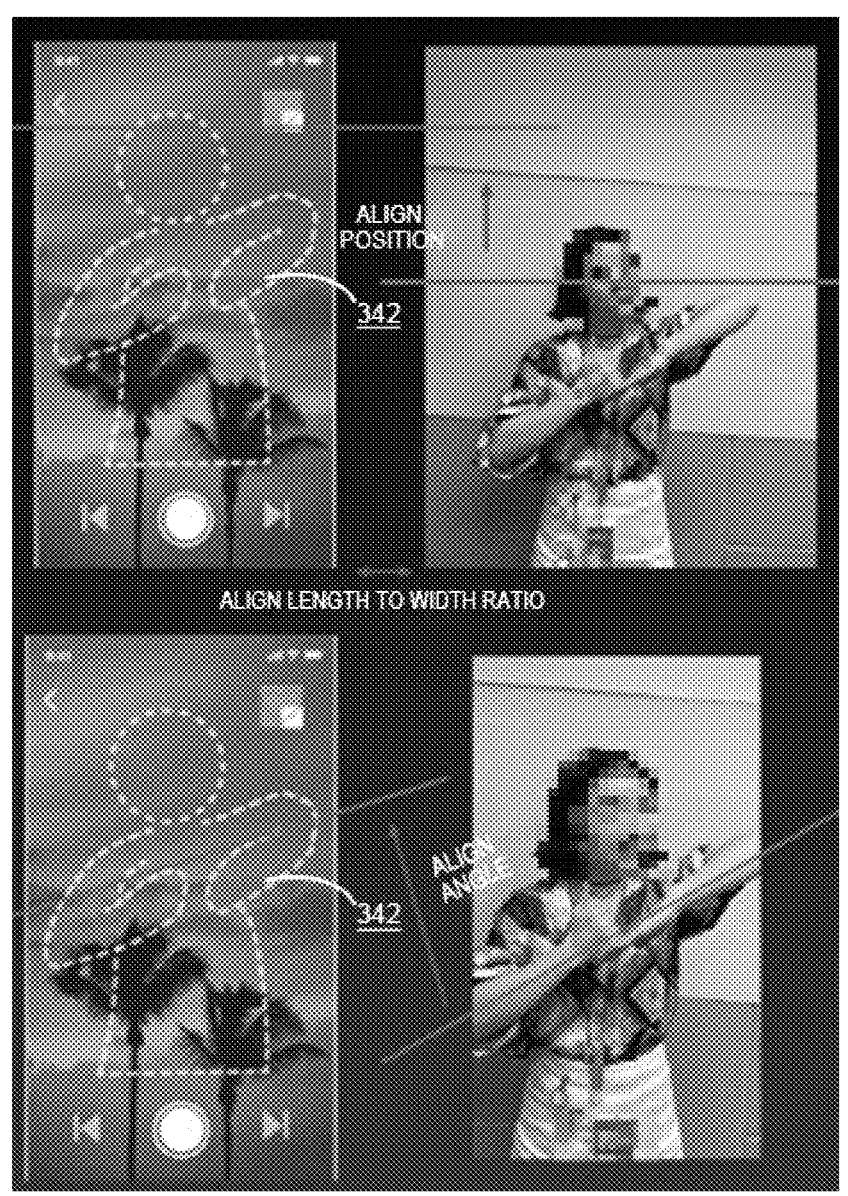
FIG. 3G is a schematic diagram of correcting data imported provided by the embodiment of the present disclosure.

FIG. 3G is a schematic diagram of correcting data imported provided by the embodiment 2 of the present disclosure. As shown in FIG. 3G, there may be errors in position and angle between the imported data imported and an auxiliary line 342 in the first set of image blocks. Therefore, the imported data imported may be cropped, aligned, rotated, scaled, stretched, etc. to match the auxiliary line 342 as much as possible.

Figure 3H:
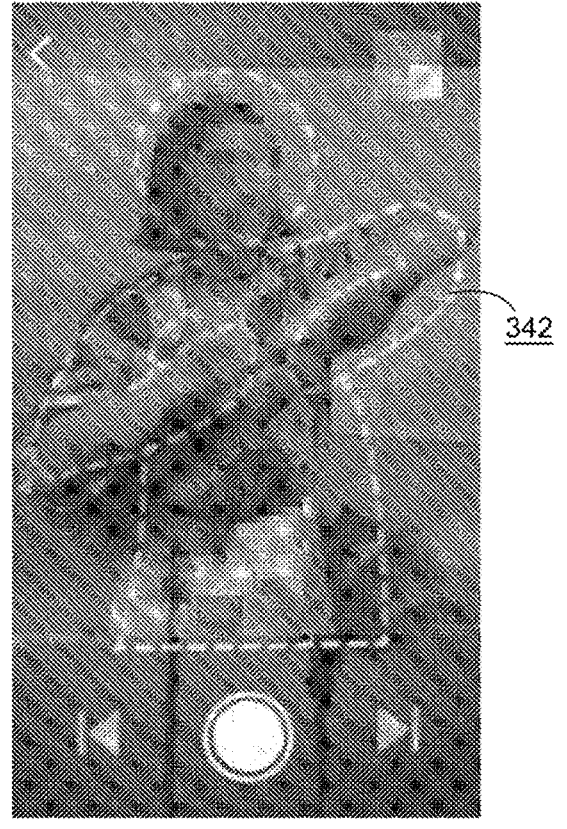
FIG. 3H is a schematic diagram of correcting data imported provided by the embodiment of the present disclosure.

FIG. 3H is a schematic diagram of a corrected data imported provided by the embodiment 2 of the present disclosure. As shown in FIG. 3H, the human body in the imported data imported is basically within the allowable error range of the auxiliary line 342. On this basis, after splicing the collage data of a plurality of image blocks, the collage making result will be completer and more accurate.

Figure 3I:
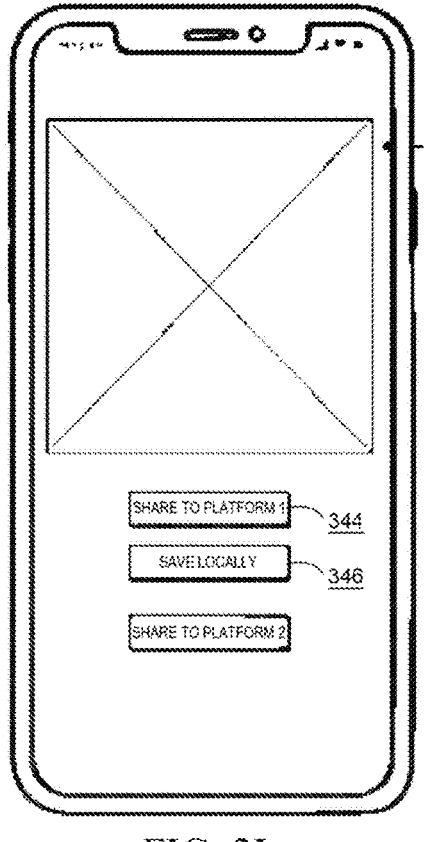
FIG. 3I is a schematic diagram of a collage completion interface provided by the embodiment of the present disclosure.

FIG. 3I is a schematic diagram of a collage completion interface provided in the embodiment 2 of the present disclosure. As shown in FIG. 3I, the collage making result is displayed in the collage completion interface, and the user may further share the collage making result to different platforms (e.g., by clicking a "share to platform 1" control 344), friends, etc., or save it to the device locally (e.g., by clicking a "save locally" control 346).

The method of collage making provided by the present embodiment supports different devices to select each image block, and import the corresponding collage data according to the auxiliary line in the image block, which may realize multi-device or multi-user cross-regional division of labor and cooperation, and improve the interactivity of the applications of collage making and the user's sense of participation. Different collage data do not need to be summarized on one device, simplifying the process of collage making and improving the efficiency of collage making. The user may use existing templates or custom templates, and may obtain collage data by way of capture, and may further automatically select existing pictures in the gallery according to the shape label, improving the flexibility and diversity of the applications of collage making. In addition, before importing collage data, the shape of the characters in the collage data may be automatically corrected, improving the accuracy of the connection between different image blocks, obtaining better splicing effect and higher collage quality. Different devices may further synchronize the imported collage data with each other, and different users may see the latest progress of collage making, enhancing the fun of the applications of collage making.

Embodiment 3

Figure 4:
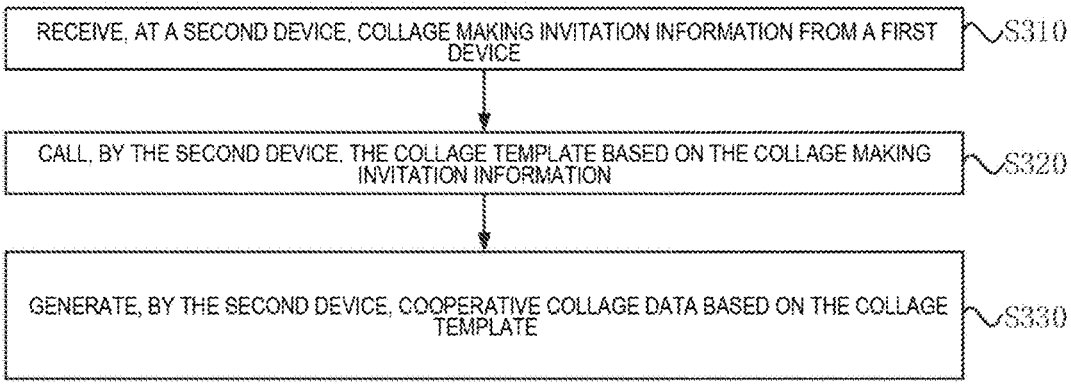
FIG. 4 is a flowchart of a method of collage making provided by an embodiment of the present disclosure.

FIG. 4 is a flowchart of a method of collage making provided in the embodiment 3 of the present disclosure. The method may be applied to the case where different devices cooperate to complete collage making. The second device may receive an invitation from the first device and cooperate with it to complete the task of collage making for different image blocks. The method may be performed by an apparatus for collage making, which may be implemented by software and/or hardware and integrated on an electronic device. The electronic device in this embodiment may be a device with image processing functions such as a computer, laptop, tablet, or smartphone. Technical details not described in this embodiment may be found in any of the above embodiments.

As shown in FIG. 4, the method of collage making provided by the embodiment 3 of the present disclosure may be applied to a second device, and the second device may be an invited device for collage making. The method of collage making is further described below.

At S310, the second device receives collage making invitation information from a first device. The collage making invitation information is associated with a collage template. The collage making invitation information is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks.

The collage making invitation information may be sent by the first device in the form of passcodes, Mini Programs, and/or web links, or forwarded by the server.

At S320, the second device calls the collage template based on the collage making invitation information.

The user of the second device may open the jigsaw application after copying the passcode in the collage making invitation information or call the jigsaw template of the first device through the Mini Program or web link, and select one or more image blocks from the second set of image blocks and import the corresponding cooperative collage data.

Figure 5:
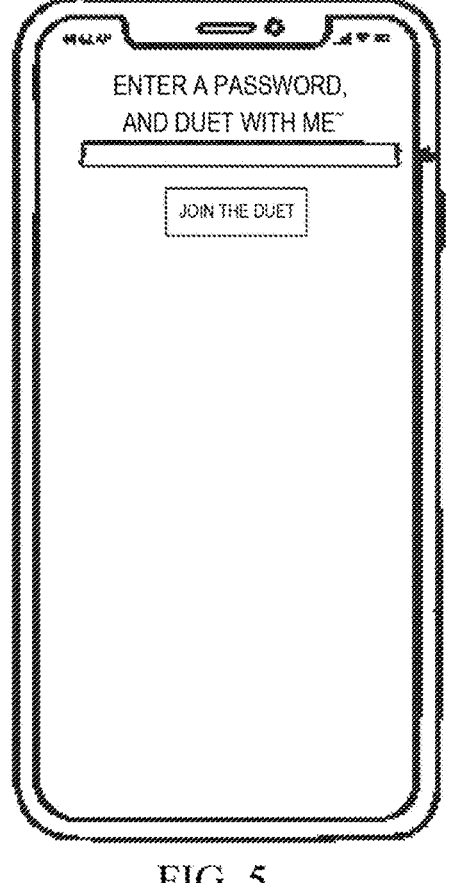
FIG. 5 is a schematic diagram of calling a collage template according to a collage making invitation information provided by the embodiment of the present disclosure.

FIG. 5 is a schematic diagram of calling a collage template based on collage making invitation information provided in the embodiment 3 of the present disclosure. As shown in FIG. 5, the user of the second device may open an application of collage making and enter the passcode in the collage making invitation information to call the collage template.

At S330, the second device generates, at the second device, cooperative collage data based on the collage template. The cooperative collage data comprises data imported for at least one second set of image blocks in the collage template. The second device obtains, at the second device, a collage making result comprises the cooperative collage data and data imported by the first device.

The present embodiment provides a method of collage making. The second device may be invited to import cooperative collage data for the second set of image blocks, thereby cooperating with the first device to complete collage making, improving the interactivity and flexibility of the applications of collage making; and in the process of collage making, collage data from different devices may be imported from the corresponding device to the corresponding image block of the collage template, without the need to first summarize to the same device, thus having a high efficiency of collage making.

In one embodiment, the collage template includes at least one type of image block: a first type of image block with a first mark displayed in a region of the first type of image block, the first mark representing that the first type of image block is in a state without the data imported; a second type of image block with a second mark displayed in a region of the second type of image block, the second mark representing that the second type of image block is in a state with the data imported, and that editing of the data imported is support; or a third type of image block with a third mark displayed in a region of the third type of image block, the third mark representing that the third type of image block is associated with the cooperative collage data of the second device.

In one embodiment, an auxiliary line corresponding to each image block in the collage template is displayed in a region of each image block; wherein an auxiliary line in each of the first set of image blocks is configured to indicate the first device to import data imported that matches the auxiliary line in each of the first set of image blocks; and an auxiliary line in each of the second set of image blocks is configured to indicate the second device to import cooperative collage data that matches the auxiliary line in each of the second set of image blocks.

In one embodiment, generating cooperative collage data according to the collage template, comprising: obtaining the data imported matching the auxiliary line in each of the first set of image blocks; and importing the data imported matching the auxiliary line in each of the first set of image blocks into each of the first set of image blocks.

The cooperative collage data may be obtained by posing for capturing by the user of the second device according to the guidance of the auxiliary line in the second set of image blocks, or may be obtained by searching from the gallery of the second device.

In one embodiment, obtaining the data imported matching the auxiliary line in each of the first set of image blocks comprises: displaying each of the first set of image blocks sequentially in a capturing interface to guide the user to complete and capture an action corresponding to each of the first set of image blocks based on the auxiliary line in each of the first set of image blocks, and using a capturing result as the data imported corresponding to each of the first set of image blocks; or, searching, based on the auxiliary line in each of the first set of image blocks, for a material with a shape label matching the auxiliary line in each of the first set of image blocks from a specified material library, and using the searched material as the data imported corresponding to each of the first set of image blocks.

One case is that the user of the second device completes and captures the corresponding action according to the auxiliary line in the second set of image blocks to obtain the cooperative collage data corresponding to the second set of image blocks. Another case is to search for suitable images to import from the second device's gallery according to the auxiliary line of each of the second set of image blocks.

In one embodiment, before importing the data imported matching the auxiliary line in each of the first set of image blocks into each of the first set of image blocks, the method further comprising: for each of the first set of image blocks, extracting key points in the data imported matching the auxiliary line in each of the first set of image blocks; and correcting the data imported to cause the key points in the data imported to match the auxiliary line in each of the first set of image blocks.

For the cooperative collage data captured or searched from the gallery, the human key points in the image may be extracted by deep learning method, aligned with the auxiliary line in the second set of image blocks, and rotated, scaled, stretched, etc. with reference to the auxiliary line in the second set of image blocks to correct the position and angle of the cooperative collage data, so that the key points in the cooperative collage data coincide with the auxiliary line as much as possible, thereby matching the collage template more accurately, and making the collage data in different image blocks more accurately connected. For example, the human key points in the image may be extracted by neural network model.

After extracting the key points in the cooperative collage data, some key points that match the auxiliary line in the second set of image blocks may be selected, to crop the cooperative collage data. On this basis, the part that may match the auxiliary line in the second set of image blocks may be corrected.

After the second device calls the collage template, the data imported imported by the first device for the first set of image blocks may further be synchronized to the second device in real time. That is, each device may see the locally imported collage data and the collage data imported from other devices in different locations. Based on this, different devices may splice the collage data and generate the spliced result.

The method of collage making provided by the present embodiment supports different devices to select each image block and import the corresponding collage data according to the auxiliary line in the image block, which may realize multi-device or multi-user cross-regional division of labor and cooperation, and improve the interactivity of the applications of collage making and the user's sense of participation. Different collage data do not need to be summarized on one device, simplifying the process of collage making and improving the efficiency of collage making. The user may use existing templates or custom templates, and may obtain collage data by way of capture, and may further automatically select existing pictures in the gallery according to the shape label, improving the flexibility and diversity of the applications of collage making. In addition, before importing collage data, the shape of the characters in the collage data may be automatically corrected, improving the accuracy of the connection between different image blocks, obtaining better splicing effect and higher collage quality. Different devices may further synchronize the imported collage data with each other, and different users may see the latest progress of collage making, enhancing the fun of the applications of collage making.

Embodiment 4

Figure 6:
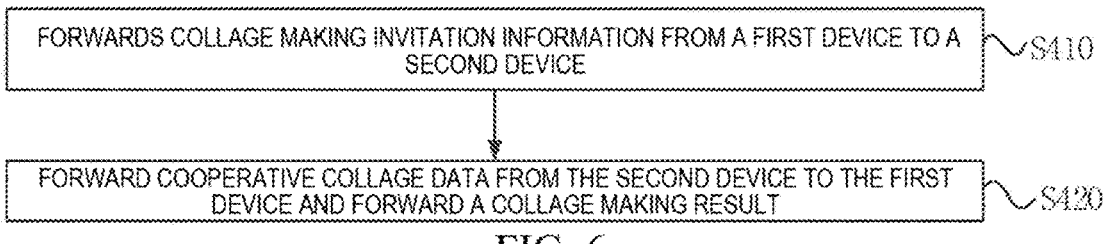
FIG. 6 is a flowchart of a method of collage making provided by an embodiment of the present disclosure.

FIG. 6 is a flowchart of a method of collage making provided in the embodiment 4 of the present disclosure. This method may be applied to situations where a server helps different devices collaborate to complete collage making. The server may forward collage making invitations between different devices, and may further synchronize collage data of different devices. This method may be performed by an apparatus for collage making, which may be implemented by software and/or hardware and integrated on an electronic device. The electronic device in this embodiment may be a server for the applications of collage making or platforms.

Technical details not described in detail in this embodiment may be found in any of the above embodiments.

As shown in FIG. 6, the embodiment 4 of the present disclosure provide a method of collage making, which may be applied to a network device. The method of collage making is further described below.

At S410, the network device forwards collage making invitation information from a first device to a second device. The collage making invitation information is associated with a collage template. The collage making invitation information is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks.

The collage making invitation information may be forwarded to the second device in the form of passcode, Mini Program, web links, etc.

At S420, the network device forwards cooperative collage data from the second device to the first device. The cooperative collage data comprises data imported for at least one second set of image blocks in the collage template. The network device forwards a collage making result. The collage making result comprises the cooperative collage data and data imported by the first device.

The server may forward the cooperative collage data imported by the second device to the first device or may forward the collage making result to each device after generating a collage making result based on the collage data imported by different devices.

The present embodiment provides a method of collage making, which may realize synchronization of collage making invitation and collage data between different devices through the server, thereby realizing multi-user or multi-device collaborative to make collage, improving the interactivity and flexibility of the applications of collage making; and in the process of collage making, the collage data from different devices may be imported from the corresponding device into the image block of the collage template, without the need to first summarize to the same device, thereby improving the efficiency of collage making.

In one embodiment, the network device receives the data imported uploaded by the first device and the cooperative collage data uploaded by the second device. The network device obtains, based on the collage template, a collage making result by splicing the data imported corresponding to each of the first set of image blocks and the cooperative collage data corresponding to each of the second set of image blocks.

The data imported imported by the first device for the first set of image blocks will be uploaded to the server, and the cooperative collage data imported by the second device for the second set of image blocks will further be uploaded to the server. Based on this, the collage making result is obtained by splicing the collage data uploaded by a plurality of devices by the server. In addition, the server may further send the collage making result to any device.

The method of collage making according to the present embodiment utilizes the server to forward the collage making invitation information and cooperative collage data, and supports different devices respectively to select image blocks to cooperate in completing collage making, thereby realizing multi-device or multi-user across-regional collaboration, improving the interactivity of the applications of collage making and the users sense of participation; different devices may synchronize the display of imported collage data, making it more interesting.

Embodiment 5

Figure 7:
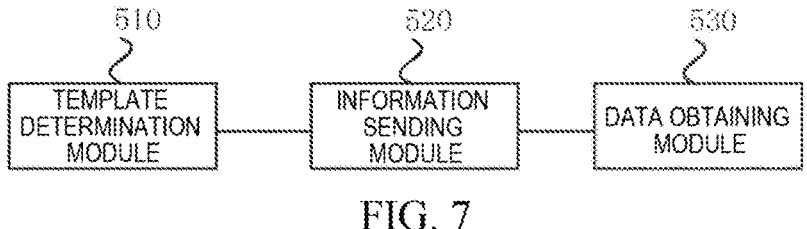
FIG. 7 is a schematic diagram of a structure of an apparatus for collage making provided by an embodiment of the present disclosure.

FIG. 7 is a structural schematic diagram of an apparatus for collage making provided by an embodiment 5 of the present disclosure. Please refer to the above embodiments for details of the present embodiment.

As shown in FIG. 7, the apparatus includes a template determination module 510 configured to determine a collage template and a first set of image blocks in the collage template of which data is to be imported by the first device The collage template comprises a plurality of image blocks, and the first set of image blocks is a subset of the plurality of image blocks. The apparatus further includes an information sending module 520 configured to send collage making invitation information to a second device. The collage making invitation information is associated with the collage template, and is further associated with at least one of the first set of image blocks and a second set of image blocks in the collage template of which data to be imported by the second device. The apparatus further includes a data obtaining module 530 configured to obtain cooperative collage data of the second device. The cooperative collage data of the second device comprises data imported by the second device for at least one second set of image blocks in the collage template. The apparatus further includes a result obtaining module configured to obtain a collage making result. The collage making result comprises the cooperative collage data and data imported by the first device.

The apparatus for collage making of the present embodiment, by inviting the second device to import collage data for different image blocks, thereby cooperating with the second device to complete collage making, improving the interactivity and flexibility of the applications of collage making, and further improving the efficiency of collage making.

In one embodiment, the template determination module 510 is configured for determining the collage template based on selection information input by a user through a template selection page. A content displayed in the template selection page comprises identifications of a plurality of candidate collage templates. Alternatively or in addition, the template determination module 510 is configured for generating the collage template based on drawing data input by the user through a self-drawing page. The self-drawing page comprises a drawing board control and at least one of: an image block number selection control, an image block layout control, an auxiliary line drawing control, an clearing and redrawing control, an undo control, or a template confirmation control. The drawing data comprises image block layout data, and an auxiliary line for guiding the user to complete an action or marking a shape.

In one embodiment, the collage template comprises at least one type of image block: a first type of image block with a first mark displayed in a region of the first type of image block, the first mark representing that the first type of image block is in a state without the data imported imported; a second type of image block with a second mark displayed in a region of the second type of image block, the second mark representing that the second type of image block is in a state with the data imported imported, and that editing of the imported data imported is support; or a third type of image block with a third mark displayed in a region of the third type of image block, the third mark representing that the third type of image block is associated with the cooperative collage data of the second device.

In one embodiment, the information sending module 520 comprises an information generation unit configured for generating the collage making invitation information based on the collage template and the first set of image blocks in the collage template; and sending the collage making invitation information to the second device in the form of at least one of a passcode, an applet, and a link.

In one embodiment, an auxiliary line corresponding to each image block in the collage template is displayed in a region of each image block; wherein an auxiliary line in each of the first set of image blocks is configured to indicate the first device to import data imported that matches the auxiliary line in each of the first set of image blocks; and an auxiliary line in each of the second set of image blocks is configured to indicate the second device to import cooperative collage data that matches the auxiliary line in each of the second set of image blocks.

In one embodiment, the apparatus further comprises an obtaining module configured for obtaining the data imported matching the auxiliary line in each of the first set of image blocks; and importing the data imported matching the auxiliary line in each of the first set of image blocks into each of the first set of image blocks.

In one embodiment, the obtaining module is configured for displaying each of the first set of image blocks sequentially in a capturing interface to guide the user to complete and capture an action corresponding to each of the first set of image blocks based on the auxiliary line in each of the first set of image blocks, and using a capturing result as the data imported corresponding to each of the first set of image blocks; or, searching, based on the auxiliary line in each of the first set of image blocks, for a material with a shape label matching the auxiliary line in each of the first set of image blocks from a specified material library, and using the searched material as the data imported corresponding to each of the first set of image blocks.

In one embodiment, the apparatus further comprises a first extraction module configured for, for each of the first set of image blocks, extracting key points in the data imported matching the auxiliary line in each of the first set of image blocks; and correcting the data imported to cause the key points in the data imported to match the auxiliary line in each of the first set of image blocks.

In one embodiment, the apparatus further comprising: a display module configured for displaying the collage making result. The collage making result is obtained by splicing, based on the collage template, the data imported corresponding to each of the first set of image blocks and the cooperative collage data corresponding to each of the second set of image blocks by the first device, the second device, or a server.

The above apparatus for collage making may perform the method of collage making provided by any embodiment of the present disclosure, and has corresponding functional modules and effects to perform the method.

Embodiment 6

Figure 8:
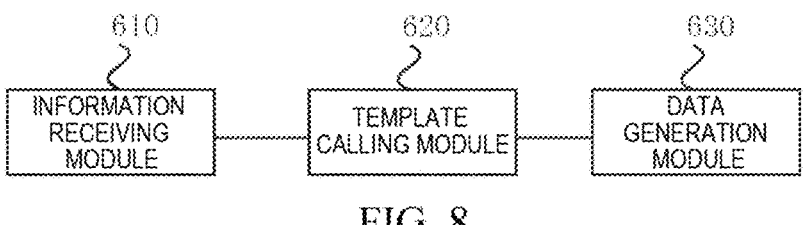
FIG. 8 is a schematic diagram of a structure of an apparatus for collage making provided by an embodiment of the present disclosure.

FIG. 8 is a structural schematic diagram of an apparatus for collage making provided by the embodiment 6 of the present disclosure. Please refer to the above embodiments for details of the present embodiment.

As shown in FIG. 8, the apparatus includes an information receiving module 610 configured to receive collage making invitation information from a first device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and first set of image blocks is a subset of the plurality of image blocks. The apparatus further includes a template calling module 620 configured to call the collage template based on the collage making invitation information. The apparatus further includes a data generation module 630 configured to generate cooperative collage data based on the collage template. The cooperative collage data comprises data imported for at least one second set of image blocks in the collage template. The apparatus further includes a result obtaining module configured to obtain a collage making result. The collage making result comprises the cooperative collage data and data imported by the first device.

The apparatus for collage making of the present embodiment, according to the collage making invitation information of the first device collage data is imported into the second set of image blocks, thereby cooperating with the first device to complete collage making, improving the interactivity and flexibility of the applications of collage making, and further improving the efficiency of collage making.

Based on the above, the data generation module 630 includes an obtaining unit configured for obtaining cooperative collage data matching an auxiliary line in each of the second set of image blocks; and importing the cooperative collage data matching with the auxiliary line in each of the second set of image blocks into each of the second set of image blocks.

Based on the above, the obtaining unit is configured for displaying each of the second set of image blocks sequentially in a capturing interface to guide a user to capture based on the auxiliary line in each of the second set of image blocks, and using a capturing result as the cooperative collage data corresponding to each of the second set of image blocks; or, searching, based on the auxiliary line in each of the second set of image blocks, for a material with a shape label matching the auxiliary line in each of the second set of image blocks from a specified material library, and using the searched material as the cooperative collage data corresponding to each of the second set of image blocks.

Based on the above, the apparatus further includes a second extraction module configured for, for each of the second set of image blocks, extracting key points in the cooperative collage data matching the auxiliary line in each of the second set of image blocks; and a second correcting module configured for correcting the cooperative collage data to cause the key points in the cooperative collage data to match the auxiliary line in each of the second set of image blocks.

The above apparatus for collage making may perform the method of collage making provided by any embodiment of the present disclosure, and has corresponding functional modules and effects to perform the method.

Embodiment 7

Figure 9:
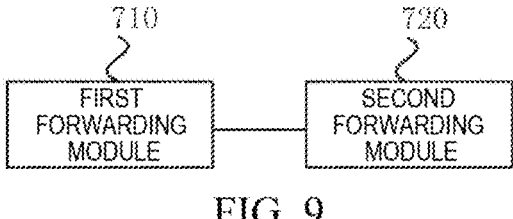
FIG. 9 is a schematic diagram of a structure of an apparatus for collage making provided by an embodiment of the present disclosure.

FIG. 9 is a structural schematic diagram of an apparatus for collage making provided by the embodiment 7 of the present disclosure. Please refer to the above embodiments for details of the present embodiment. As shown in FIG. 9, the apparatus includes a first forwarding module 710 configured to forward collage making invitation information from a first device to a second device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks. The apparatus further includes a second forwarding module 720 configured to forward cooperative collage data from the second device to the first device. The cooperative collage data comprises data imported for at least one second set of image blocks in the collage template. The apparatus further includes a third forwarding module configured to forward a collage making result. The collage making result comprises the cooperative collage data and data imported by the first device.

The apparatus for collage making of the present embodiment, by forwarding collage making invitation information and cooperative collage data, realizes that the first device and the second device import collage data for different image blocks, cooperates to complete collage making, improves the interactivity and flexibility of the applications of collage making, and further improves the efficiency of collage making.

Based on the above, the apparatus further includes a data receiving module configured for receiving the data imported and uploaded by the first device and the cooperative collage data uploaded by the second device. The apparatus further includes a splicing module configured for obtaining, based on the collage template, a collage making result by splicing the data imported corresponding to each of the first set of image blocks and the cooperative collage data corresponding to each of the second set of image blocks.

The above apparatus for collage making may perform the method of collage making provided by any embodiment of the present disclosure, and has corresponding functional modules and effects to perform the method.

Embodiment 8

Figure 10:
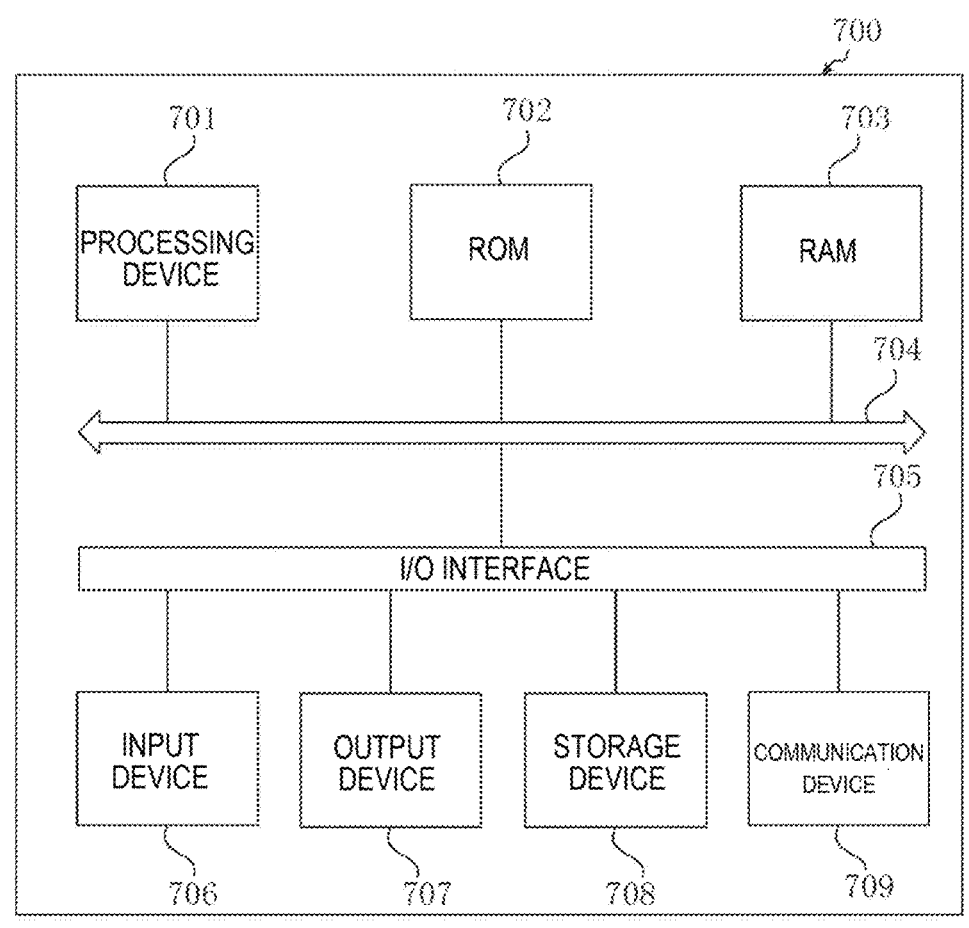
FIG. 10 is a schematic diagram of a hardware structure of an electronic device provided by an embodiment of the present disclosure.

FIG. 10 is a schematic diagram of a hardware structure of an electronic device provided by the embodiment 8 of the present disclosure. FIG. 10 shows a schematic diagram of the structure of an electronic device 700 suitable for implementing the embodiments of the present disclosure. The electronic device 700 in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device 700 shown in FIG. 10 is merely an example, and should not impose any limitation to the function or the scope of application of the embodiments of the present disclosure.

As shown in FIG. 10, the electronic device 700 may include a processing device (such as a central processing unit and a graphics processor) 701, which may execute various appropriate actions and processing according to a program stored in a read-only memory (ROM) 702 or a program loaded to a random access memory (RAM) 703 from a storage device 708. One or more processing device 701 implements the method provided by the present disclosure. Various programs and data required during operation of the electronic device 700 are further stored in the RAM 703. The processing device 701, the ROM 702 and the RAM 703 are connected with one another via a bus 704. An input/output (I/O) interface 705 is further connected to the bus 704.

Generally, the following apparatuses may be connected to the I/O interface 705: an input device 706 including for example a touch screen, a touch pad, a keyboard, a mouse, a camera, a microphone, an accelerometer and a gyroscope; an output device 707 including for example a liquid crystal display (LCD), a speaker and a vibrator, a storage device 708 including for example a magnetic tape and a hard disk; and a communication device 709. The communication device 709 may allow wireless or wired communication between the electronic device 700 and other devices for data exchange. Although FIG. 10 shows the electronic device 700 having various devices, it should be understood that not all the devices shown are necessarily required to be implemented or provided. More or fewer devices may alternatively be implemented or provided.

According to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 709, or installed from the storage device 808, or installed from the ROM 702. The computer program, when executed by the processing device 701, causes the processing unit to execute the above functions defined in the methods according to the embodiments of the present disclosure.

The computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may further be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, clients and servers can communicate with any currently known or future developed network protocol such as HyperText Transfer Protocol (HTTP) and can interconnect with any form or medium of digital data communication (e.g., communication networks). Examples of communication networks include local area networks (LANs), wide area networks (WANs), the Internet (such as the Internet), and end-to-end networks (e.g., ad hoc end-to-end networks), as well as any currently known or future developed networks.

The computer-readable medium may be included in the electronic device described above; or it may stand alone without being assembled into the electronic device.

The computer-readable medium carries at least one program, and the at least one program described above, when executed by the electronic device, causes the electronic device to: determine a collage template and a first set of image blocks in the collage template of which data is to be imported by the first device. The collage template comprises a plurality of image blocks, and the first set of image blocks is a subset of the plurality of image blocks. The electronic device is further caused to send collage making invitation information to a second device. The collage making invitation information is associated with the collage template, and is further associated with at least one of the first set of image blocks and a second set of image blocks in the collage template of which data to be imported by the second device. The electronic device is further caused to obtain cooperative collage data of the second device. The cooperative collage data of the second device comprises data imported by the second device for at least one second set of image blocks in the collage template. The electronic device is further caused to determine a collage making result. The college inking result comprises the cooperative collage data and data imported by the first device.

Alternatively or in addition, the electronic device is caused to: receive collage making invitation information from a first device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks. The electronic device is further caused to call the collage template based on the collage making invitation information. The electronic device is further caused to generate cooperative collage data based on the collage template. The cooperative collage data comprises data imported for at least one second set of image blocks in the collage template. The electronic device is further caused to obtain a collage making result. The collage making result comprises the cooperative collage data and data imported by the first device.

Alternatively or in addition, the electronic device is caused to: forward collage making invitation information from a first device to a second device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks The electronic device is further caused to forward cooperative collage data from the second device to the first device. The cooperative collage data comprises data imported for at least one second set of image blocks in the collage template The electronic device is further caused to forward a collage making result. The collage making result comprises the cooperative collage data and data imported by the first device.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should further be noted that, in some alternative implementations, the functions noted in the blocks may further occur in a sequence different from those illustrated in the drawings. For example, two consecutive blocks may be executed substantially in parallel, and may sometimes be executed in an opposite order, depending on the functions involved. It should further be noted that each block in the block diagrams and/or the flowcharts, and combinations of the blocks in the block diagrams and/or flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware. In some cases, the names of the modules do not constitute limitations to the modules themselves.

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, Example 1 provides a method of collage making. The method is further described below.

A first device determines a collage template and a first set of image blocks in the collage template of which data is to be imported by the first device. The collage template comprises a plurality of image blocks, and the first set of image blocks is a subset of the plurality of image blocks;

The first device sends collage making invitation information to a second device. The collage making invitation information is associated with the collage template, and is further associated with at least one of the first set of image blocks and a second set of image blocks in the collage template of which data to be imported by the second device; and The first device obtains cooperative collage data of the second device. The cooperative collage data of the second device comprises data imported by the second device for at least one second set of image blocks in the collage template. The first device obtains a collage making result. The collage making result comprises the cooperative collage data and data imported by the first device.

Example 2 according to the method described in Example 1, the first device determines the collage template based on selection information input by a user through a template selection page. A content displayed in the template selection page comprises identifications of a plurality of candidate collage templates. Alternatively or in addition, the first device generates the collage template based on drawing data input by the user through a self-drawing page. The self-drawing page comprises a drawing board control and at least one of: an image block number selection control, an image block layout control, an auxiliary line drawing control, a clearing and redrawing control, an undo control, or a template confirmation control. The drawing data comprises image block layout data, and an auxiliary line for guiding the user to complete an action or marking a shape.

Example 3 according to the method described in Example 1, the collage template comprises at least one type of image block. A first type of image block with a first mark displayed in a region of the first type of image block, the first mark representing that the first type of image block is in a state without the data imported imported; a second type of image block with a second mark displayed in a region of the second type of image block, the second mark representing that the second type of image block is in a state with the data imported imported, and that editing of the imported data imported is support; or a third type of image block with a third mark displayed in a region of the third type of image block, the third mark representing that the third type of image block is associated with the cooperative collage data of the second device.

Example 4 according to the method described in Example 1, the first device generates the collage making invitation information based on the collage template and the first set of image blocks in the collage template. The first device sends the collage making invitation information to the second device in the form of at least one of a passcode, an applet, and a link.

Example 5 according to the method described in Example 1, an auxiliary line corresponding to each image block in the collage template is displayed in a region of each image block. An auxiliary line in each of the first set of image blocks is configured to indicate the first device to import data imported that matches the auxiliary line in each of the first set of image blocks. An auxiliary line in each of the second set of image blocks is configured to indicate the second device to import cooperative collage data that matches the auxiliary line in each of the second set of image blocks.

Example 6 according to the method described in Example 5, the first device obtains the data imported matching the auxiliary line in each of the first set of image blocks. The first device imports the data imported matching the auxiliary line in each of the first set of image blocks into each of the first set of image blocks.

Example 7 according to the method described in Example 5, the first device displays each of the first set of image blocks sequentially in a capturing interface to guide the user to complete and capture an action corresponding to each of the first set of image blocks based on the auxiliary line in each of the first set of image blocks. The first device uses a capturing result as the data imported corresponding to each of the first set of image blocks. Alternatively or in addition, the first device searches, based on the auxiliary line in each of the first set of image blocks, for a material with a shape label matching the auxiliary line in each of the first set of image blocks from a specified material library, and the first device uses the searched material as the data imported corresponding to each of the first set of image blocks.

Example 8 according to the method described in Example 5, before importing the data imported matching the auxiliary line in each of the first set of image blocks into each of the first set of image blocks, the first device, for each of the first set of image blocks, extracts key points in the data imported matching the auxiliary line in each of the first set of image blocks. The first device corrects the data imported to cause the key points in the data imported to match the auxiliary line in each of the first set of image blocks.

Example 9 according to the method described in Example 1, the first device displays the collage making result. The collage making result is obtained by splicing, based on the collage template and by the first device or the second device the data imported corresponding to each of the first set of image blocks and the cooperative collage data corresponding to each of the second set of image blocks.

According to one or more embodiments of the present disclosure, Example 10 provides a method of collage making. The method is further described below.

The second device receives collage making invitation information from a first device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks.

The second device calls the collage template based on the collage making invitation information; and The second device generates cooperative collage data based on the collage template. The cooperative collage data comprises data imported for at least one second set of image blocks in the collage template, and a collage making result comprises the cooperative collage data and data imported by the first device.

Example 11 according to the method described in Example 10, the second device obtains cooperative collage data matching an auxiliary line in each of the second set of image blocks. The second device imports the cooperative collage data matching with the auxiliary line in each of the second set of image blocks into each of the second set of image blocks.

Example 12 according to the method described in Example 11, the second device displays each of the second set of image blocks sequentially in a capturing interface to guide a user to capture based on the auxiliary line in each of the second set of image blocks. The second device uses a capturing result as the cooperative collage data corresponding to each of the second set of image blocks. Alternatively or in addition, the second device searches, based on the auxiliary line in each of the second set of image blocks, for a material with a shape label matching the auxiliary line in each of the second set of image blocks from a specified material library, and the second device uses the searched material as the cooperative collage data corresponding to each of the second set of image blocks.

Example 13 according to the method described in Example 11, before importing the cooperative collage data matching the auxiliary line in each of the second set of image blocks into each of the second set of image blocks, the second device, for each of the second set of image blocks, extracts key points in the cooperative collage data matching the auxiliary line in each of the second set of image blocks. The second device corrects the cooperative collage data to cause the key points in the cooperative collage data to match the auxiliary line in each of the second set of image blocks.

According to one or more embodiments of the present disclosure, Example 14 provides a method of collage making. The method of collage making is further described below.

A server forwards collage making invitation information from a first device to a second device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks.

The server forwards cooperative collage data from the second device to the first device. The cooperative collage data comprises data imported for at least one second set of image blocks in the collage template. The server forwards a collage making result. The collage making result comprises the cooperative collage data and data imported by the first device.

Example 15 according to the method described in Example 14, the server receives the data imported uploaded by the first device and the cooperative collage data uploaded by the second device. The server obtains, based on the collage template, a collage making result by splicing the data imported corresponding to each of the first set of image blocks and the cooperative collage data corresponding to each of the second set of image blocks.

According to one or more embodiments of the present disclosure, Example 16 provides an apparatus for collage making. The apparatus includes a template determination module configured to determine a collage template and a first set of image blocks in the collage template of which data is to be imported by the first device. The collage template comprises a plurality of image blocks, and the first set of image blocks is a subset of the plurality of image blocks. The apparatus further includes an information sending module configured to send collage making invitation information to a second device. The collage making invitation information is associated with the collage template, and is further associated with at least one of the first set of image blocks and a second set of image blocks in the collage template of which data to be imported by the second device. The apparatus further includes a data obtaining module configured to obtain cooperative collage data of the second device. The cooperative collage data of the second device comprises data imported by the second device for at least one second set of image blocks in the collage template. The apparatus further includes a result obtaining module configured to obtain a collage making result. The collage making result comprises the cooperative collage data and data imported by the first device.

According to one or more embodiments of the present disclosure, Example 17 provides an apparatus for collage making. The apparatus includes an information receiving module configured to receive collage making invitation information from a first device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks. The apparatus further includes a template calling module configured to call the collage template based on the collage making invitation information. The apparatus further includes a data generation module configured to generate cooperative collage data based on the collage template. The cooperative collage data comprises data imported for at least one second set of image blocks in the collage template. The apparatus further includes a result forwarding module configured to forward a collage making result. The collage making result comprises the cooperative collage data and data imported by the first device.

According to one or more embodiments of the present disclosure, Example 18 provides an apparatus for collage making. The apparatus includes a first forwarding module configured to forward collage making invitation information from a first device to a second device. The collage making invitation information is associated with a collage template, and is further associated with at least one of the following in the collage template: a first set of image blocks of which data is to be imported by the first device and a second set of image blocks of which data is to be imported by the second device. The collage template comprises a plurality of image blocks, and the first set of image blocks is a subset of the plurality of image blocks. The apparatus further includes a second forwarding module configured to forward cooperative collage data from the second device to the first device. The cooperative collage data comprises data imported for at least one second set of image blocks in the collage template. The apparatus further includes a third forwarding module configured to forward a collage making result. The collage making result comprises the cooperative collage data and data imported by the first device.

According to one or more embodiments of the present disclosure, Example 19 provides an electronic device. The electronic device comprises one or more processors and a storage device configured to store one or more programs. The one or more programs, when the one or more programs executed by the one or more processors, causes the one or more processors to implement the method of collage making as in any of Examples 1 to 9 or as in Example 10 to 13 or the method of collage making as in any of Examples 14 and 15.

According to one or more embodiments of the present disclosure, Example 20 provides a computer readable medium having stored thereon a computer program. The program, when executed by a processor, implements the method of collage making as in any of Example 10 to 13 or as the method of collage making in any of Example 14 and 15.

In addition, although various operations are depicted in a specific order, it should not be understood as requiring such operations to be performed in the specific order shown or in a sequential order. Under given conditions, multi-task processing and parallel processing may be advantageous. Similarly, although details of several specific implementations are included in the foregoing discussion, these details should not be construed as a limitation to the scope of the present disclosure. Some features described in the context of individual embodiments may also be implemented in a single embodiment in combination. On the contrary, various features described in the context of a single embodiment may also be implemented in a plurality of embodiments separately or in any suitable sub-combination.

We claim:

1. A method of collage making, comprising:
determining, at a first device, a collage template and a first set of image blocks in the collage template to receive data imported by the first device, wherein the collage template comprises a plurality of image blocks and the first set of image blocks is a subset of the plurality of image blocks;

sending, at the first device, collage making invitation information to a second device, wherein the collage making invitation information is associated with the collage template, at least one of the first set of image blocks, and a second set of image blocks in the collage template to receive data to imported by the second device;

obtaining, at the first device, cooperative collage data of the second device, wherein the cooperative collage data of the second device comprises data imported by the second device for the second set of image blocks; and obtaining, at the first device, a collage making result, wherein the collage making result comprises the cooperative collage data and the data imported by the first device, and wherein an auxiliary line corresponding to each image block in the collage template is displayed in a region of each image block;

an auxiliary line in each of the first set of image blocks is configured to indicate the first device to import data that matches a shape represented by the auxiliary line in each of the first set of image blocks; and an auxiliary line in each of the second set of image blocks is configured to indicate the second device to import cooperative collage data that matches a shape represented by the auxiliary line in each of second set of image blocks.

2. The method of claim 1, wherein determining a collage template comprises:
determining the collage template based on selection information input by a user through a template selection page, wherein a content displayed in the template selection page comprises identifications of a plurality of candidate collage templates; or generating the collage template based on drawing data input by the user through a self-drawing page; wherein the self-drawing page comprises a drawing board control and at least one of: an image block number selection control, an image block layout control, an auxiliary line drawing control, an clearing and redrawing control, an undo control, or a template confirmation control; the drawing data comprises image block layout data, and the auxiliary line for guiding the user to complete an action or marking a shape.

3. The method of claim 1, wherein the collage template comprises at least one of:
a first type of image block with a first mark displayed in a region of the first type of image block, the first mark representing that the first type of image block is in a state without the data imported;

a second type of image block with a second mark displayed in a region of the second type of image block, the second mark representing that the second type of image block is in a state with the data imported, and the second mark further representing that editing of the data imported is support; or a third type of image block with a third mark displayed in a region of the third type of image block, the third mark representing that the third type of image block is associated with the cooperative collage data of the second device.

4. The method of claim 1, wherein sending collage making invitation information to a second device comprises:
generating the collage making invitation information based on the collage template and the first set of image blocks in the collage template; and sending the collage making invitation information to the second device in the form of at least one of a passcode, an applet, and a link.

5. The method of claim 1, further comprising:
obtaining the data imported matching the shape represented by the auxiliary line in each of the first set of image blocks; and importing the data imported matching the shape represented by the auxiliary line in each of the first set of image blocks into each of the first set of image blocks.

6. The method of claim 1, wherein obtaining the data imported matching the shape represented by the auxiliary line in each of the first set of image blocks comprises:
displaying each of the first set of image blocks sequentially in a capturing interface to guide a user to complete and capture an action corresponding to each of the first set of image blocks based on the auxiliary line in each of the first set of image blocks, and using a capturing result as the data imported corresponding to each of the first set of image blocks; or, searching, based on the auxiliary line in each of the first set of image blocks, for a material with a shape label matching the shape represented by the auxiliary line in each of the first set of image blocks from a specified material library, and using the searched material as the data imported corresponding to each of the first set of image blocks.

7. The method of claim 1, before importing the data imported matching the shape represented by the auxiliary line in each of the first set of image blocks into each of the first set of image blocks, the method further comprising:

for each of the first set of image blocks, extracting key points in the data imported matching the shape represented by the auxiliary line in each of the first set of image blocks; and correcting the data imported to cause the key points in the data imported to match the shape represented by the auxiliary line in each of the first set of image blocks.

8. The method of claim 1, further comprising:

displaying the collage making result, wherein the collage making result is obtained by splicing, based on the collage template and by the first device or the second device, the data imported corresponding to each of the first set of image blocks and the cooperative collage data corresponding to each of the second set of image blocks.

9. A method of collage making, comprising:

receiving, at a second device, collage making invitation information from a first device, wherein the collage making invitation information is associated with a collage template, and is further associated with at least one of the following in the collage template: a first set of image blocks of which data is to be imported by the first device and a second set of image blocks of which data is to be imported by the second device, wherein the collage template comprises a plurality of image blocks, and the first set of image blocks is a subset of the plurality of image blocks comprised in the collage template;

calling, at the second device, the collage template based on the collage making invitation information;

generating, at the second device, cooperative collage data based on the collage template, wherein the cooperative collage data comprises data imported for at least one second set of image blocks in the collage template; and obtaining, at the second device, a collage making result, wherein the collage making result comprises the cooperative collage data and data imported by the first device, and wherein an auxiliary line corresponding to each image block in the collage template is displayed in a region of each image block;

an auxiliary line in each of the first set of image blocks is configured to indicate the first device to import data that matches a shape represented by the auxiliary line in each of the first set of image blocks; and an auxiliary line in each of the second set of image blocks is configured to indicate the second device to import cooperative collage data that matches a shape represented by matches the auxiliary line in each of second set of image blocks.

10. The method of claim 9, wherein generating cooperative collage data based on the collage template comprises:

obtaining cooperative collage data matching the shape represented by the auxiliary line in each of the second set of image blocks; and importing the cooperative collage data matching the shape represented by the auxiliary line in each of the second set of image blocks into each of the second set of image blocks.

11. The method of claim 10, wherein obtaining cooperative collage data matching the shape represented by the auxiliary line in each of the second set of image blocks comprises:

displaying each of the second set of image blocks sequentially in a capturing interface to guide a user to capture based on the auxiliary line in each of the second set of image blocks, and using a capturing result as the cooperative collage data corresponding to each of the second set of image blocks; or, searching, based on the auxiliary line in each of the second set of image blocks, for a material with a shape label matching the shape represented by the auxiliary line in each of the second set of image blocks from a specified material library, and using the searched material as the cooperative collage data corresponding to each of the second set of image blocks.

12. The method of claim 10, before importing the cooperative collage data matching the shape represented by the auxiliary line in each of the second set of image blocks into each of the second set of image blocks, the method further comprising:

for each of the second set of image blocks, extracting key points in the cooperative collage data matching the shape represented by the auxiliary line in each of the second set of image blocks; and correcting the cooperative collage data to cause the key points in the cooperative collage data to match the shape represented by the auxiliary line in each of the second set of image blocks.

13. An electronic device, comprising:

at least one processor; and a storage device configured to store at least one program;

when the at least one program executed by the at least one processor, causing the at least one processor to perform operations comprising:

determining, at a first device, a collage template and a first set of image blocks in the collage template to receive data imported by the first device, wherein the collage template comprises a plurality of image blocks and the first set of image blocks is a subset of the plurality of image blocks;

sending, at the first device, collage making invitation information to a second device, wherein the collage making invitation information is associated with the collage template, at least one of the first set of image blocks, and a second set of image blocks in the collage template to receive data to imported by the second device; and obtaining, at the first device, cooperative collage data of the second device, wherein the cooperative collage data of the second device comprises data imported by the second device for the second set of image blocks; and obtaining, at the first device, a collage making result, wherein the collage making result comprises the cooperative collage data and the data imported by the first device, and wherein an auxiliary line corresponding to each image block in the collage template is displayed in a region of each image block;

an auxiliary line in each of the first set of image blocks is configured to indicate the first device to import data imported that matches a shape represented by the auxiliary line in each of the first set of image blocks; and an auxiliary line in each of the second set of image blocks is configured to indicate the second device to import cooperative collage data that matches a shape represented by the auxiliary line in each of second set of image blocks.

14. The device of claim 13, wherein determining a collage template comprises:

determining the collage template based on selection information input by a user through a template selection page, wherein a content displayed in the template selection page comprises identifications of a plurality of candidate collage templates; or, generating the collage template based on drawing data input by the user through a self-drawing page; wherein the self-drawing page comprises a drawing board control and at least one of: an image block number selection control, an image block layout control, an auxiliary line drawing control, an clearing and redrawing control, an undo control, or a template confirmation control; the drawing data comprises image block layout data, and the auxiliary line for guiding the user to complete an action or marking a shape.

15. The device of claim 13, wherein the collage template comprises at least one type of image block of:

a first type of image block with a first mark displayed in a region of the first type of image block, the first mark representing that the first type of image block is in a state without the data imported;

a second type of image block with a second mark displayed in a region of the second type of image block, the second mark representing that the second type of image block is in a state with the data imported, and the second mark further representing that editing of the data imported is support; or a third type of image block with a third mark displayed in a region of the third type of image block, the third mark representing that the third type of image block is associated with the cooperative collage data of the second device.

16. The device of claim 13, wherein sending collage making invitation information to a second device comprises:

generating the collage making invitation information based on the collage template and the first set of image blocks in the collage template; and sending the collage making invitation information to the second device in the form of at least one of a passcode, an applet, and a link.

17. The device of claim 13, the operations further comprising:

obtaining the data imported matching the shape represented by the auxiliary line in each of the first set of image blocks; and importing the data imported matching the shape represented by the auxiliary line in each of the first set of image blocks into each of the first set of image blocks.

18. The device of claim 13, the operations further comprising:

displaying the collage making result, wherein the collage making result is obtained by splicing, based on the collage template and by the first device or the second device, the data imported corresponding to each of the first set of image blocks and the cooperative collage data corresponding to each of the second set of image blocks.

\* \* \* \* \*